(12) United States Patent
Tsurube

(10) Patent No.: US 8,502,880 B2
(45) Date of Patent: Aug. 6, 2013

(54) IMAGE PROCESSING APPARATUS, IMAGE PROCESSING METHOD, AND PROGRAM

(75) Inventor: Tomoyuki Tsurube, Tokyo (JP)

(73) Assignee: Panasonic Corporation, Osaka (JP)

( * ) Notice: Subject to any disclaimer, the term of this patent is extended or adjusted under 35 U.S.C. 154(b) by 71 days.

(21) Appl. No.: 13/356,798

(22) Filed: Jan. 24, 2012

(65) Prior Publication Data

US 2012/0176514 A1 Jul. 12, 2012

Related U.S. Application Data

(63) Continuation of application No. PCT/JP2011/000065, filed on Jan. 11, 2011.

(30) Foreign Application Priority Data

Jul. 7, 2010 (JP) .................................. 2010-154477

(51) Int. Cl.
*H04N 5/228* (2006.01)
*H04N 9/68* (2006.01)

(52) U.S. Cl.
USPC .......................... 348/222.1; 348/234; 348/192

(58) Field of Classification Search
None
See application file for complete search history.

(56) References Cited

U.S. PATENT DOCUMENTS

| | | | | |
|---|---|---|---|---|
| 4,858,027 A | * | 8/1989 | Sashou et al. ................. | 386/287 |
| 5,394,187 A | * | 2/1995 | Shipp ............................ | 348/269 |
| 5,446,492 A | * | 8/1995 | Wolf et al. .................... | 348/192 |
| 6,343,146 B1 | * | 1/2002 | Tsuruoka et al. ............. | 382/163 |
| 8,195,010 B2 | * | 6/2012 | Okamoto et al. ............. | 382/309 |
| 2010/0134652 A1 | | 6/2010 | Takane | |
| 2011/0043691 A1 | * | 2/2011 | Guitteny et al. .............. | 348/500 |

FOREIGN PATENT DOCUMENTS

| | | |
|---|---|---|
| JP | 2003-018617 A | 1/2003 |
| JP | 2004-096488 A | 3/2004 |
| JP | 2007-028236 A | 2/2007 |
| JP | 2009-033629 A | 2/2009 |
| JP | 2009-121870 A | 6/2009 |
| JP | 2010-130435 A | 6/2010 |

OTHER PUBLICATIONS

International Search Report for PCT/JP2011/000065 dated Jul. 7, 2010.

* cited by examiner

*Primary Examiner* — Hung Lam
(74) *Attorney, Agent, or Firm* — Pearne & Gordon LLP

(57) ABSTRACT

An image processing apparatus (1) performs matching processing with respect to a first video signal and a second video signal obtained from two imaging devices (3). The matching processing minimizes a disparity amount between the first video signal and the second video signal. A third video signal obtained from one of the imaging devices (3) is shifted by a minimum disparity amount obtained as a result of the matching processing, and is added to a fourth video signal obtained from the other imaging device (3). Non-linear processing and/or contour correction processing is performed on the video signal obtained by adding the two video signals, and a monitoring image is generated. Thus, an image processing apparatus is provided that can obtain a monitoring image of high image quality by adding two video signals and utilizing the resulting video signal as a monitoring image.

11 Claims, 4 Drawing Sheets

IMAGE PROCESSING APPARATUS, IMAGE PROCESSING METHOD, AND PROGRAM

TECHNICAL FIELD

The present invention relates to an image processing apparatus that utilizes stereo matching.

BACKGROUND ART

A stereo image processing apparatus that measures a distance to a photographing object by performing stereo measurement is already known (for example, see Patent Literature 1). According to the conventional stereo image processing apparatus, a distance to a photographing object is calculated using two camera images that are photographed using two cameras. The two camera images can also be said to be images for distance measurement. Further, according to the conventional stereo image processing apparatus, one of the two camera images (images for distance measurement) is used as a monitoring image.

However, according to the conventional image processing apparatus, since only one of the two camera images (images for distance measurement) is utilized as a monitoring image, the signal-to-noise ratio (S/N ratio) of the video signal is low. Non-linear processing such as gamma correction processing is performed on a video signal to be used for a monitoring image, and the amplitude of a low- or medium-brightness video signal is expanded. However, at such time, if the S/N ratio of the video signal is low, the non-linear processing causes an increase in the amount of noise, and the image quality of the monitoring image deteriorates as a result.

CITATION LIST

Patent Literature

[Patent Literature 1] Japanese Patent Laid-Open No. 2009-121870

SUMMARY OF INVENTION

Technical Problem

The present invention has been made in view of the foregoing circumstances. An object of the present invention is to provide an image processing apparatus that can obtain a monitoring image of good image quality.

Solution to Problem

According to one aspect of the present invention, there is provided an image processing apparatus that includes: a matching section that, with respect to a first video signal obtained from a first image pickup section and a second video signal obtained from a second image pickup section, performs matching processing that minimizes a disparity amount between the first video signal and the second video signal; an addition section that shifts a third video signal obtained from the first image pickup section by a minimum disparity amount that is obtained as a result of the matching processing, and adds the thus-shifted third video signal to a fourth video signal obtained from the second image pickup section; and a monitoring image generation section that performs non-linear processing and/or contour correction processing with respect to the video signal obtained by adding the third video signal to the fourth video signal, and generates a monitoring image.

According to another aspect of the present invention, there is provided an image processing method that includes: performing matching processing that, with respect to a first video signal obtained from a first image pickup section and a second video signal obtained from a second image pickup section, minimizes a disparity amount between the first video signal and the second video signal; shifting a third video signal obtained from the first image pickup section by a minimum disparity amount obtained as a result of the matching processing, and adding the thus-shifted third video signal to a fourth video signal obtained from the second image pickup section; and performing non-linear processing and/or contour correction processing with respect to the video signal obtained by adding the third video signal to the fourth video signal, and generating a monitoring image.

According to a further aspect of the present invention, there is provided an image processing program that causes a computer to execute: matching processing that, with respect to a first video signal obtained from a first image pickup section and a second video signal obtained from a second image pickup section, minimizes a disparity amount between the first video signal and the second video signal; processing that shifts a third video signal obtained from the first image pickup section by a minimum disparity amount that is obtained as a result of the matching processing, and adds the thus-shifted third video signal to a fourth video signal obtained from the second image pickup section; and processing that carries out non-linear processing and/or contour correction processing with respect to the video signal obtained by adding the third video signal to the fourth video signal, and generates a monitoring image.

As described hereunder, the present invention includes other aspects. Accordingly, this disclosure of the invention is intended to provide some aspects of the present invention, and is not intended to limit the scope of the invention as described and claimed herein.

DESCRIPTION OF EMBODIMENTS

Figure 1:
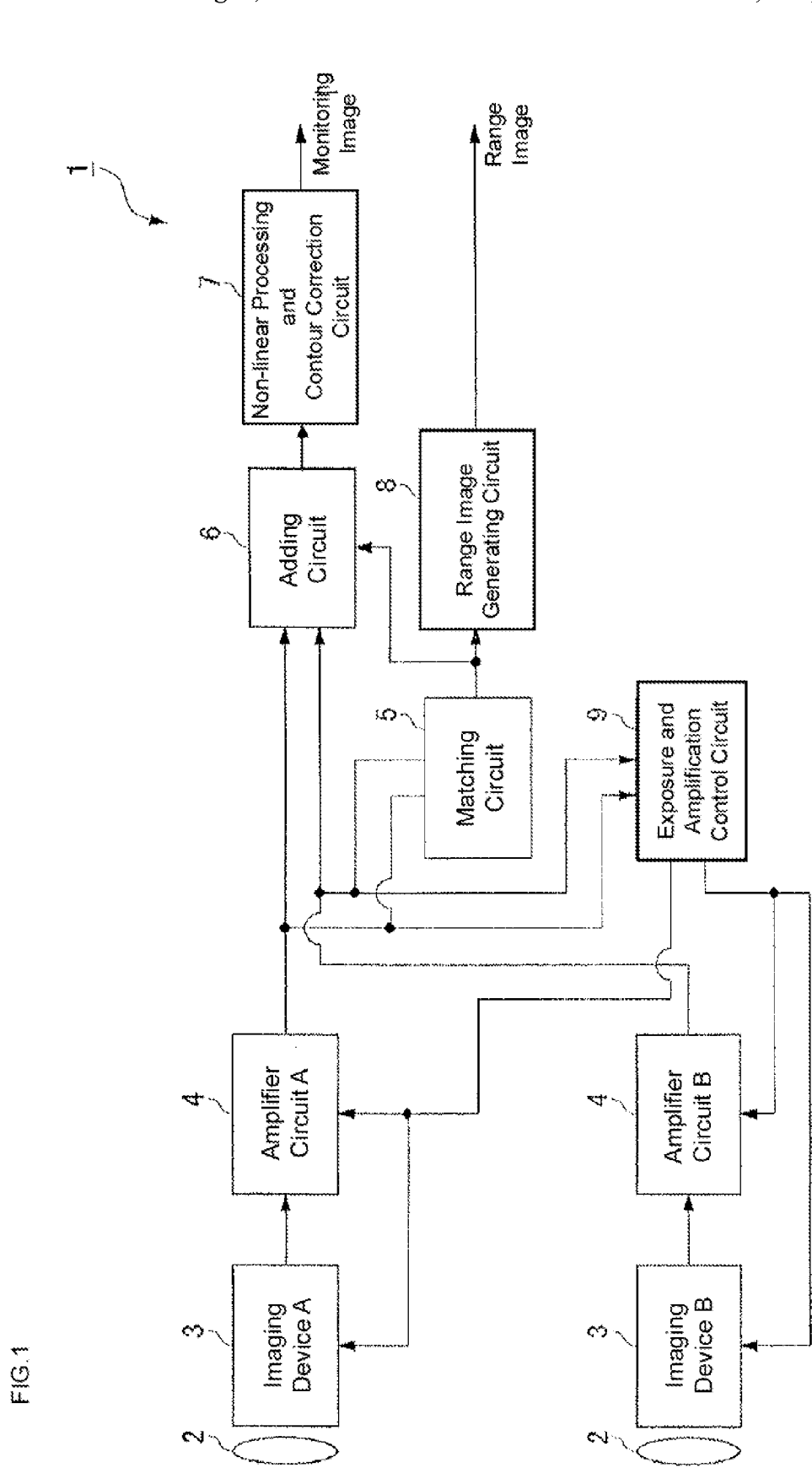
FIG. 1 is a block diagram of an image processing apparatus according to an embodiment of the present invention.

The present invention is described in detail hereunder. However, the following detailed description and the attached drawings do not limit the invention.

An image processing apparatus of the present invention includes: a matching section that, with respect to a first video signal obtained from a first image pickup section and a second video signal obtained from a second image pickup section, performs matching processing that minimizes a disparity amount between the first video signal and the second video signal; an addition section that shifts a third video signal obtained from the first image pickup section by, a minimum disparity amount that is obtained as a result of the matching processing, and adds the thus-shifted third video signal to a fourth video signal obtained from the second image pickup section; and a monitoring image generation section that performs non-linear processing and/or contour correction processing with respect to the video signal obtained by adding the third video signal to the fourth video signal, and generates a monitoring image.

According to this configuration, matching processing is performed on video signals (a first video signal and a second video signal) obtained from two image pickup sections, and a disparity amount between the video signals from the two image pickup sections is determined. Subsequently, two video signals (a third video signal and a fourth video signal) are added together in a manner that takes into consideration the disparity amount between the video signals obtained from the two image pickup sections, and a video signal obtained as a result of adding the two video signals (the third video signal and the fourth video signal) is utilized as a monitoring image. Since the S/N ratio of the video signal obtained as the result of adding the two video signals is higher than that of a single video signal, a monitoring image of good image quality can be obtained.

The image processing apparatus of the present invention may also include a range image generation section that generates an image for distance measurement based on the minimum disparity amount that is obtained as a result of the matching processing.

According to this configuration, as well as obtaining a monitoring image of good image quality, an image for distance measurement (a range image) can be obtained.

Further, the image processing apparatus of the present invention may have a configuration that includes a control section that controls an exposure time or an amplification factor of the first video signal and the second video signal so that the first video signal and the second video signal are within a predetermined range of brightness levels, wherein the matching section performs matching processing with respect to the first video signal and the second video signal that are within the predetermined range of brightness levels as a result of the control by the control section.

According to this configuration, an exposure time or an amplification factor is controlled so that a brightness level of a video signal is within a predetermined range of brightness levels. For example, with respect to a low- or medium-brightness video signal, the control section performs control to lengthen the exposure time or increase the amplification factor. Further, with respect to a high-brightness video signal, the control section performs control to shorten the exposure time or decrease the amplification factor. Therefore, even when a high-brightness subject is photographed, it is possible to suppress a decline in the image quality caused by a white washout, and the accuracy of the matching processing that uses two video signals (the first video signal and the second video signal) can be improved. Thus, even when a high-brightness subject is photographed, because two video signals (the third video signal and the fourth video signal) can be added together based on the result (minimum disparity amount) of highly accurate matching processing, a monitoring image of good image quality can be obtained.

Further, the image processing apparatus of the present invention may have a configuration that includes a second control section that controls an exposure time of the third video signal and an exposure time of the fourth video signal so that the exposure time of the third video signal and the exposure time of the fourth video signal are mutually different.

According to this configuration, since the exposure times of the third video signal and the fourth video signal can be made to differ from each other, a dynamic range of a monitoring image that is obtained by adding two video signals (the third video signal and the fourth video signal) can be extended. For example, when a high-brightness subject is photographed, control is performed that shortens the exposure time of both the third video signal and the fourth video signal, and in this case, control is also performed that makes the exposure time of the third video signal shorter than the exposure time of the fourth video signal. Thus, even when a high-brightness subject is photographed, it is possible to reduce the occurrence of a white washout in the monitoring image (image obtained by adding the third video signal and the fourth video signal), and a monitoring image with gradations can be obtained even when the subject has a high level of brightness.

The image processing apparatus of the present invention may have a configuration that includes a third control section that controls an exposure time or an amplification factor of the first video signal, the second video signal, the third video signal, and the fourth video signal, wherein: in a first time period, the third control section controls an exposure time or an amplification factor of the first video signal and the second video signal so that the first video signal and the second video signal are within a first brightness level range; in a second time period, the third control section controls an exposure time or an amplification factor of the third video signal and the fourth video signal so that the third video signal and the fourth video signal are within a second brightness level range; in a third time period, the third control section controls an exposure time or an amplification factor of the first video signal and the second video signal so that the first video signal and the second video signal are within a third brightness level range that is different to the first brightness level range; and in a fourth time period, the third control section controls an exposure time or an amplification factor of the third video signal and the fourth video signal so that the third video signal and the fourth video signal are within a fourth brightness level range that is different to the second brightness level range.

According to this configuration, with respect to the first video signal and the second video signal, in the first time period, video signals (for example, which have a low or medium brightness level) that are within a first brightness level range are obtained, and in the third time period, video signals (for example, which have a high brightness level) that are within a third brightness level range are obtained. Further, with respect to the third video signal and the fourth video signal, in the second time period, video signals (for example, which have a low or medium brightness level) that are within a second brightness level range are obtained, and in the fourth time period, video signals (for example, which have a high brightness level) that are within a fourth brightness level range are obtained. Thus, video signals that have different brightness levels can be obtained in the respective time periods from the first to the fourth time period. Accordingly, it is possible to acquire a monitoring image that is obtained by adding video signals (the third video signal and the fourth video signal) which have brightness levels that are in a wide range of brightness levels (a wide range from a low brightness to a high brightness), and thus the dynamic range of the monitoring image can be extended. Therefore, for example, even when a high-brightness subject is photographed, it is possible to reduce the occurrence of a white washout in a monitoring image (image obtained by adding the third video signal and the fourth video signal), and a monitoring image with gradations can be obtained even when the subject has a high level of brightness.

An image processing method of the present invention includes: performing matching processing that, with respect to a first video signal obtained from a first image pickup section and a second video signal obtained from a second image pickup section, minimizes a disparity amount between the first video signal and the second video signal; shifting a third video signal obtained from the first image pickup section by a minimum disparity amount obtained as a result of the matching processing, and adding the thus-shifted third video signal to a fourth video signal obtained from the second image pickup section; and performing non-linear processing and/or contour correction processing with respect to the video signal obtained by adding the third video signal to the fourth video signal, and generating a monitoring image.

According to this method also, similarly to the above description, since two video signals (the third video signal and the fourth video signal) are added in a manner that takes into consideration a disparity amount between video signals obtained from two image pickup sections, and a video signal obtained as a result of adding the two signals is utilized as a monitoring image, a monitoring image of good image quality can be obtained.

The image processing method of the present invention may include generating an image for distance measurement based on the minimum disparity amount that is obtained as a result of the matching processing.

According to this method also, similarly to the above description, as well as obtaining a monitoring image of good image quality, an image for distance measurement (a range image) can be obtained.

Further, the image processing method of the present invention may include controlling an exposure time or an amplification factor of the first video signal and the second video signal so that the first video signal and the second video signal are within a predetermined range of brightness levels, wherein the matching processing is performed with respect to the first video signal and the second video signal that are within the predetermined range of brightness levels as a result of the control.

According to this method also, similarly to the above description, even when a high-brightness subject is photographed, it is possible to suppress a decline in the image quality caused by a white washout, and the accuracy of the matching processing that uses two video signals (the first video signal and the second video signal) can be improved.

The image processing method of the present invention may also include controlling an exposure time of the third video signal and an exposure time of the fourth video signal so that the exposure time of the third video signal and the exposure time of the fourth video signal are mutually different.

According to this method also, similarly to the above description, a dynamic range of a monitoring image that is obtained by adding two video signals (the third video signal and the fourth video signal) can be extended.

Further, the image processing method of the present invention may include controlling an exposure time or an amplification factor of the first video signal, the second video signal, the third video signal, and the fourth video signal, wherein: in a first time period, an exposure time or an amplification factor of the first video signal and the second video signal is controlled so that the first video signal and the second video signal are within a first brightness level range; in a second time period, an exposure time or an amplification factor of the third video signal and the fourth video signal is controlled so that the third video signal and the fourth video signal are within a second brightness level range; in a third time period, an exposure time or an amplification factor of the first video signal and the second video signal is controlled so that the first video signal and the second video signal are within a third brightness level range that is different to the first brightness level range; and in a fourth time period, an exposure time or an amplification factor of the third video signal and the fourth video signal is controlled so that the third video signal and the fourth video signal are within a fourth brightness level range that is different to the second brightness level range.

According to this method also, similarly to the above description, it is possible to acquire a monitoring image that is obtained by adding video signals (the third video signal and the fourth video signal) which have brightness levels that are in a wide range of brightness levels (a wide range from a low brightness to a high brightness), and thus the dynamic range of the monitoring image can be extended.

A program of the present invention causes a computer to execute: matching processing that, with respect to a first video signal obtained from a first image pickup section and a second video signal obtained from a second image pickup section, minimizes a disparity amount between the first video signal and the second video signal; processing that shifts a third video signal obtained from the first image pickup section by a minimum disparity amount that is obtained as a result of the matching processing, and adds the thus-shifted third video signal to a fourth video signal obtained from the second image pickup section; and processing that carries out non-linear processing and/or contour correction processing with respect to the video signal obtained by adding the third video signal to the fourth video signal, and generates a monitoring image.

According to this program also, similarly to the above description, since two video signals (the third video signal and the fourth video signal) can be added in a manner that takes into consideration a disparity amount between video signals obtained from two image pickup sections, and a video signal obtained as a result of adding the two video signals can be utilized as a monitoring image, a monitoring image of good image quality can be obtained.

According to the present invention, by adding two video signals (the third video signal and the fourth video signal) in a manner that takes into consideration a disparity amount between video signals obtained from two image pickup sections, and utilizing a video signal obtained as a result of adding the two video signals as a monitoring image, a monitoring image of high image quality can be obtained.

An image processing apparatus according to an embodiment of the present invention is described hereunder with reference to the drawings. According to the present embodiment, for example, a case of an image processing apparatus that is used for a vehicle-mounted stereo image processing apparatus or the like is exemplified. In this connection, an image processing function of the image processing apparatus of the present embodiment as described below may also be realized by a program that is stored in a memory or a hard disk drive (HDD) of the image processing apparatus.

The configuration of the image processing apparatus according to an embodiment of the present invention will now be described with reference to the drawings. As shown in FIG. 1, an image processing apparatus 1 of the present embodiment includes two imaging devices 3 (imaging device A and imaging device B) which each have a lens 2 arranged on an optical path, and two amplifier circuits 4 (amplifier circuit A and amplifier circuit B) that amplify a video signal from each imaging device 3, respectively. In this case, image pickup is performed by the lenses 2 and the imaging devices 3. The two imaging devices 3 (imaging device A and imaging device B) correspond to the first image pickup section and the second image pickup section of the present invention.

The image processing apparatus 1 includes a matching circuit 5 that performs stereo matching processing (also referred to simply as "matching processing") with respect to two video signals obtained from the two imaging devices 3 (imaging device A and imaging device B). The matching circuit 5 performs matching processing so that a disparity amount for each pixel of the two video signals is a minimum amount, and outputs a minimum disparity amount for each pixel as the result of the matching processing. The matching circuit 5 corresponds to the matching section of the present invention.

The image processing apparatus 1 also includes an adding circuit 6 that adds a video signal obtained from one of the imaging devices 3 (imaging device A) to a video signal obtained from the other imaging device 3 (imaging device B), and a non-linear processing and contour correction circuit 7 that performs non-linear processing, such as gamma correction processing, or contour correction processing with respect to a video signal obtained by adding the two video signals, and generates a monitoring image. The adding circuit 6 performs processing that shifts the video signal obtained from one of the imaging devices 3 (imaging device A) by the minimum disparity amount for each pixel that is obtained as a result of the matching processing, and adds the thus-shifted video signal to the video signal obtained from the other imaging device 3 (imaging device B). The adding circuit 6 corresponds to the addition section of the present invention. The non-linear processing and contour correction circuit 7 corresponds to the monitoring image generation section of the present invention.

The image processing apparatus 1 further includes a range image generating circuit 8 that generates an image for distance measurement based on the minimum disparity amount for each pixel that is obtained as a result of the matching processing. Based on a common triangulation principle, the range image generating circuit 8 generates an image (range image) for measuring a distance to the photographing object based on the minimum disparity amount for each pixel of the two video signals. The range image generating circuit 8 corresponds to the range image generation section of the present invention.

The image processing apparatus 1 also includes an exposure and amplification control circuit 9 that controls an exposure time of the imaging devices 3 and an amplification factor of the amplifier circuits 4. The exposure and amplification control circuit 9 controls an exposure time of the imaging devices 3 by sending a control signal to a drive circuit (unshown) of each imaging device 3. The exposure and amplification control circuit 9 also controls an amplification factor of the amplifier circuits 4 by sending a control signal to each amplifier circuit 4. The exposure and amplification control circuit 9 is equipped with a function that monitors the output (video signal obtained from the imaging device 3) from each amplifier circuit 4, and adjusts the exposure time of the imaging device 3 or adjusts the amplification factor of the amplifier circuit 4 so that the output is within a certain brightness level range. The exposure and amplification control circuit 9 corresponds to the control section, the second control section, and the third control section of the present invention.

The operation of the image processing apparatus 1 configured as described above will now be described referring to the drawings.

Figure 2:
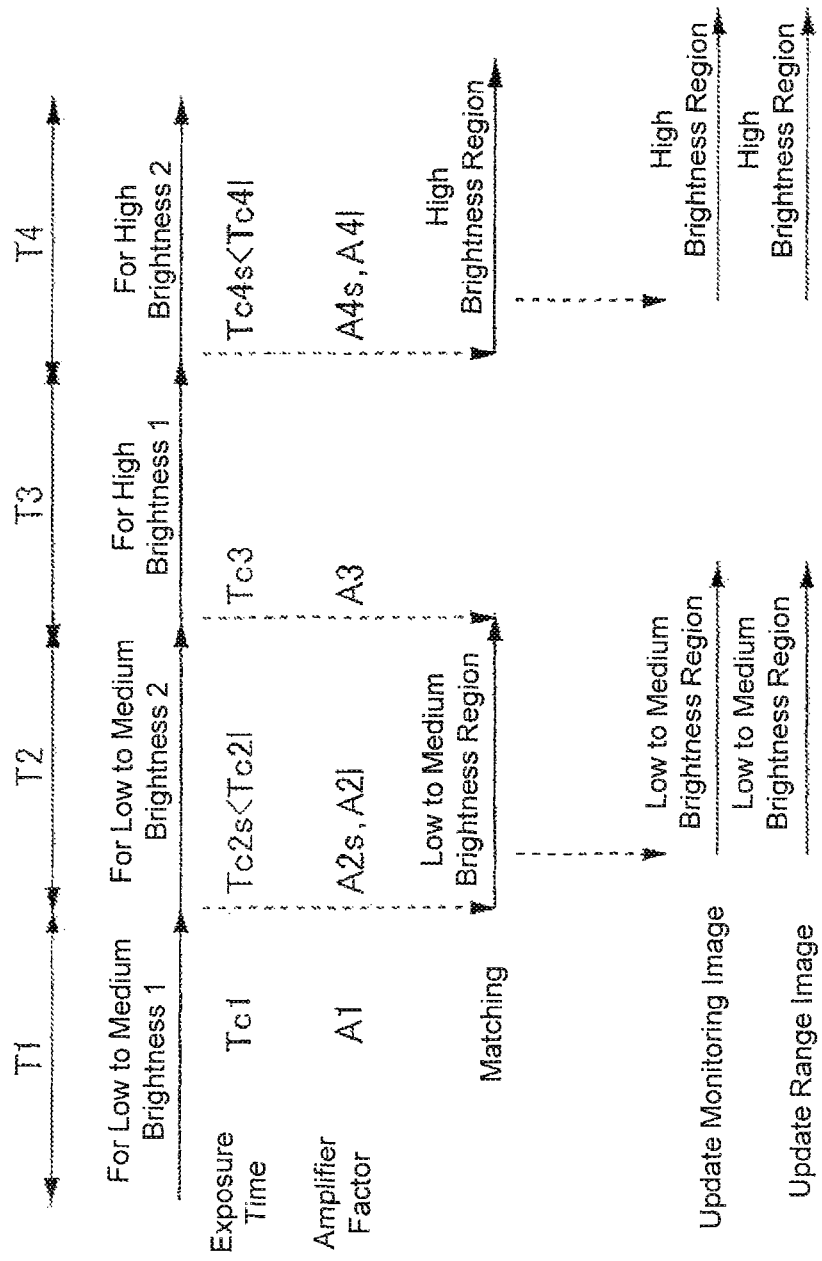
FIG. 2 is an explanatory drawing that illustrates operations of the image processing apparatus according to an embodiment of the present invention.

FIG. 2 is an explanatory view that describes the operations of the image processing apparatus 1 of the present embodiment. As shown in FIG. 2, according to the image processing apparatus 1 of the present embodiment, the exposure time of each imaging device 3 and the amplification factor of each amplifier circuit 4 are controlled so that, in a time period T1 (first time period), video signals (a first video signal and a second video signal) obtained from the two imaging devices 3 are within a range of low to medium brightness levels. In the example shown in FIG. 2, in the time period T1, the exposure times of the two imaging devices 3 (imaging device A and imaging device B) are set to an exposure time Tc1 for a low to medium brightness and the amplification factors of the two amplifier circuits 4 (amplifier circuit A and amplifier circuit B) are set to an amplification factor A1 for a low to medium brightness.

Next, in a time period T2 (second time period), the exposure times of the imaging devices 3 and the amplification factors of the amplifier circuits 4 are controlled so that video signals (a third video signal and a fourth video signal) obtained from the two imaging devices 3 are within a range of low to medium brightness levels. In the example shown in FIG. 2, in the time period T2, the exposure time of one of the imaging devices 3 (imaging device A) is set to a short exposure time Tc2$s$ for a low to medium brightness and the exposure time of the other imaging device 3 (imaging device B) is set to a long exposure time Tc2$l$ for a low to medium brightness. Further, the amplification factor of one of the amplifier circuits 4 (amplifier circuit A) is set to a low amplification factor A2$s$ for a low to medium brightness, and the amplification factor of the other amplifier circuit 4 (amplifier circuit B) is set to a high amplification factor A2$l$ for a low to medium brightness.

Further, in the time period T2, matching processing is performed with respect to the two video signals (first video signal and second video signal) obtained in the time period T1, a minimum disparity amount is calculated for each pixel, and a range image for low to medium brightness is generated (updated). Also, in the time period T2, addition processing in which the result of the above described matching processing is reflected (addition processing that is shifted by the minimum disparity amount for each pixel) is performed with respect to the two video signals (the third video signal and the fourth video signal) obtained in the time period T2, non-linear processing and contour correction processing are performed on the obtained video signal (the video signal obtained as a result of the addition processing), and a monitoring image for low to medium brightness is generated (updated).

Subsequently, in a time period T3 (third time period), the exposure times of the imaging devices 3 and the amplification factors of the amplifier circuits 4 are controlled so that the video signals (the first video signal and the second video signal) obtained from the two imaging devices 3 are within a range of high brightness levels. In the example shown in FIG. 2, in the time period T3, the exposure times of the two imaging devices 3 (imaging device A and imaging device B) are set to an exposure time Tc3 for a high brightness, and the amplification factors of the two amplifier circuits 4 (the amplifier circuit A and the amplifier circuit B) are set to an amplification factor A3 for a high brightness.

Next, in a time period T4 (fourth time period), the exposure times of the imaging devices 3 and the amplification factors of the amplifier circuits 4 are controlled so that the video signals (the third video signal and the fourth video signal) obtained from the two imaging devices 3 are within a range of high brightness levels. In the example shown in FIG. 2, in the time period T4, the exposure time of one of the imaging devices 3

(imaging device A) is set to a short exposure time Tc4s for a high brightness, and the exposure time of the other imaging device 3 (imaging device B) is set to a long exposure time Tc4l for a high brightness. Further, the amplification factor of one of the amplifier circuits 4 (amplifier circuit A) is set to an amplification factor A4s, and the amplification factor of the other amplifier circuit 4 (amplifier circuit B) is set to an amplification factor A4l.

Furthermore, in the time period T4, matching processing is performed with respect to the two video signals (the first video signal and the second video signal) obtained in the time period T3, a minimum disparity amount is calculated for each pixel, and a range image for high brightness is generated (updated). Also, in the time period T4, addition processing in which the result of the above described matching processing is reflected (addition processing that is shifted by the minimum disparity amount for each pixel) is performed with respect to the two video signals (the third video signal and the fourth video signal) obtained in the time period T3, non-linear processing and contour correction processing are performed on the obtained video signal (the video signal obtained as a result of the addition processing), and a monitoring image for high brightness is generated (updated).

According to the image processing apparatus 1 of the present embodiment, the processing in the time periods T1 to T4 as described above is repeated at fixed intervals. More specifically, processing that updates (generates) a range image and a monitoring image for low to medium brightness and processing that updates (generates) a range image and a monitoring image for high brightness are repeated at fixed intervals.

Hereunder, the operations of the image processing apparatus 1 of the present embodiment are divided into operations for generating a range image and a monitoring image and operations for generating an image with low to medium brightness and an image with high brightness, and the respective operations are described in detail.

Figure 3:
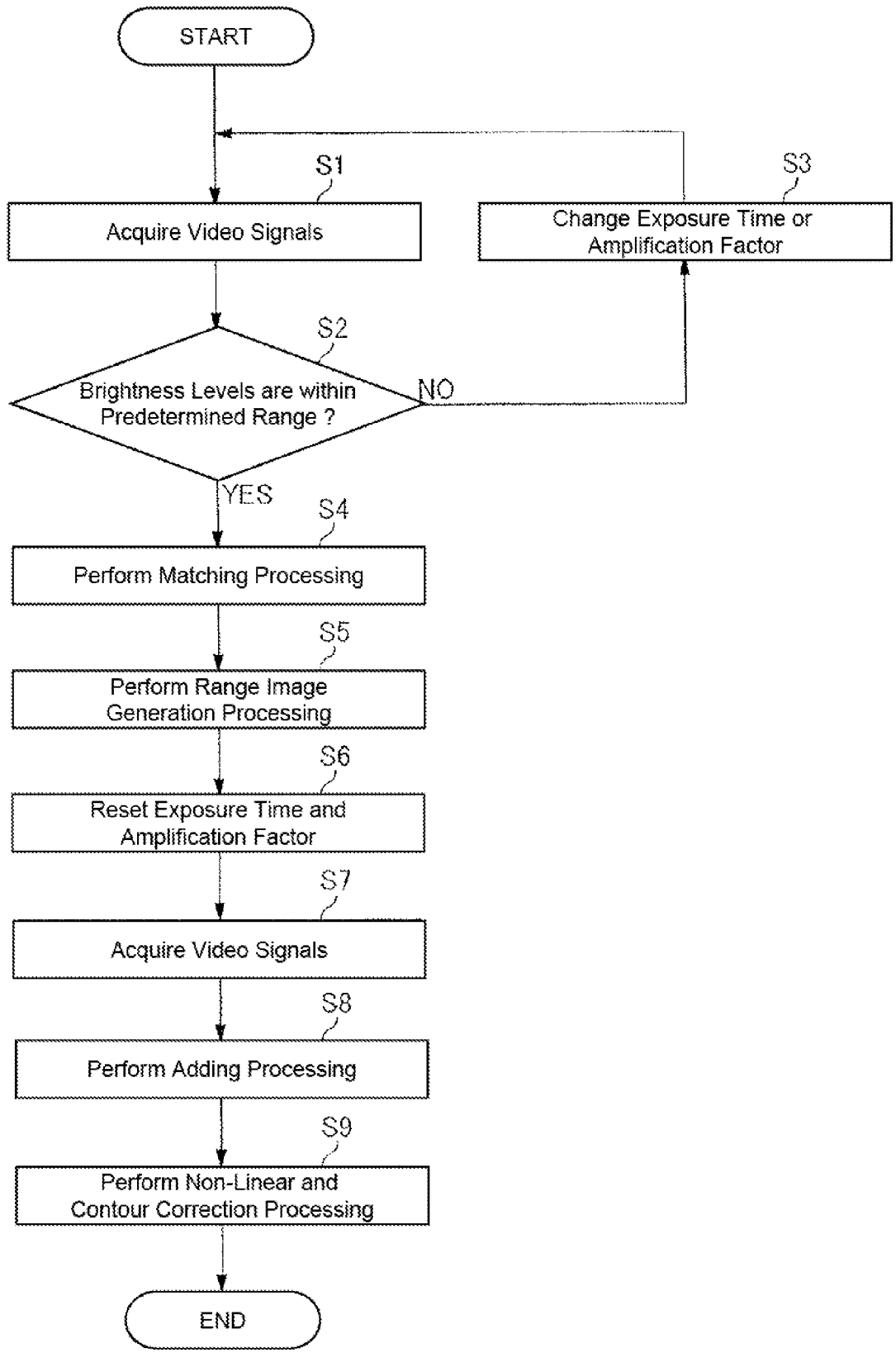
FIG. 3 is a flowchart that shows a processing flow that generates a range image and a monitoring image according to an embodiment of the present invention.

FIG. 3 is a flowchart that shows a processing flow that generates a range image and generates a monitoring image. As shown in FIG. 3, at the image processing apparatus 1, first, two video signals (the first video signal and the second video signal) are acquired from the two imaging devices 3 (the imaging device A and the imaging device B) (S1), and the image processing apparatus 1 determines whether or not the brightness levels thereof are within a predetermined range of brightness levels (S2). For example, if the brightness level of a video signal is lower than a predetermined reference brightness level, it is determined that the brightness level is within a range of low to medium brightness levels. Further, if the brightness level of a video signal is higher than the predetermined reference brightness level, it is determined that the brightness level is within a range of high brightness levels.

If the determined result is that the brightness levels of the video signals are not within the range of predetermined brightness levels, the exposure times of the imaging devices 3 or the amplification factors of the amplifier circuits 4 are changed (S3), and the aforementioned steps (S1 and S2) are repeated.

In contrast, if the determined result is that the brightness levels of the video signals are within the range of predetermined brightness levels, matching processing of the two video signals (first video signal and second video signal) is performed with respect to an image region thereof (for example, an image region with low to medium brightness), and a minimum disparity amount for each pixel is determined (S4). Subsequently, processing is performed that generates a range image using a common triangulation principle based on the minimum disparity amount for each pixel that is obtained as a result of the matching processing (S5).

Next, an exposure time for a short exposure (for example, the exposure time Tc2s) is set in one of the imaging devices 3 (imaging device A), an amplification factor for a short exposure (for example, the amplification factor A2s) is set in one of the amplifier circuits 4 (amplifier circuit A), an exposure time for a long exposure (for example, the exposure time Tc2l) is set in the other imaging device 3 (imaging device B), and an amplification factor for a long exposure (for example, the amplification factor A2l) is set in the other amplifier circuit 4 (amplifier circuit B) (S6).

Subsequently, two video signals (the third video signal and the fourth video signal) are acquired from the two imaging devices 3 (S7), one of the video signals is shifted by the minimum disparity amount for each pixel that is obtained as the result of the above described matching processing in S4, and the two video signals are added together (S8). Finally, a video signal obtained by adding the two video signals in S8 is subjected to non-linear processing and contour correction processing to generate a monitoring image (S9).

Figure 4:
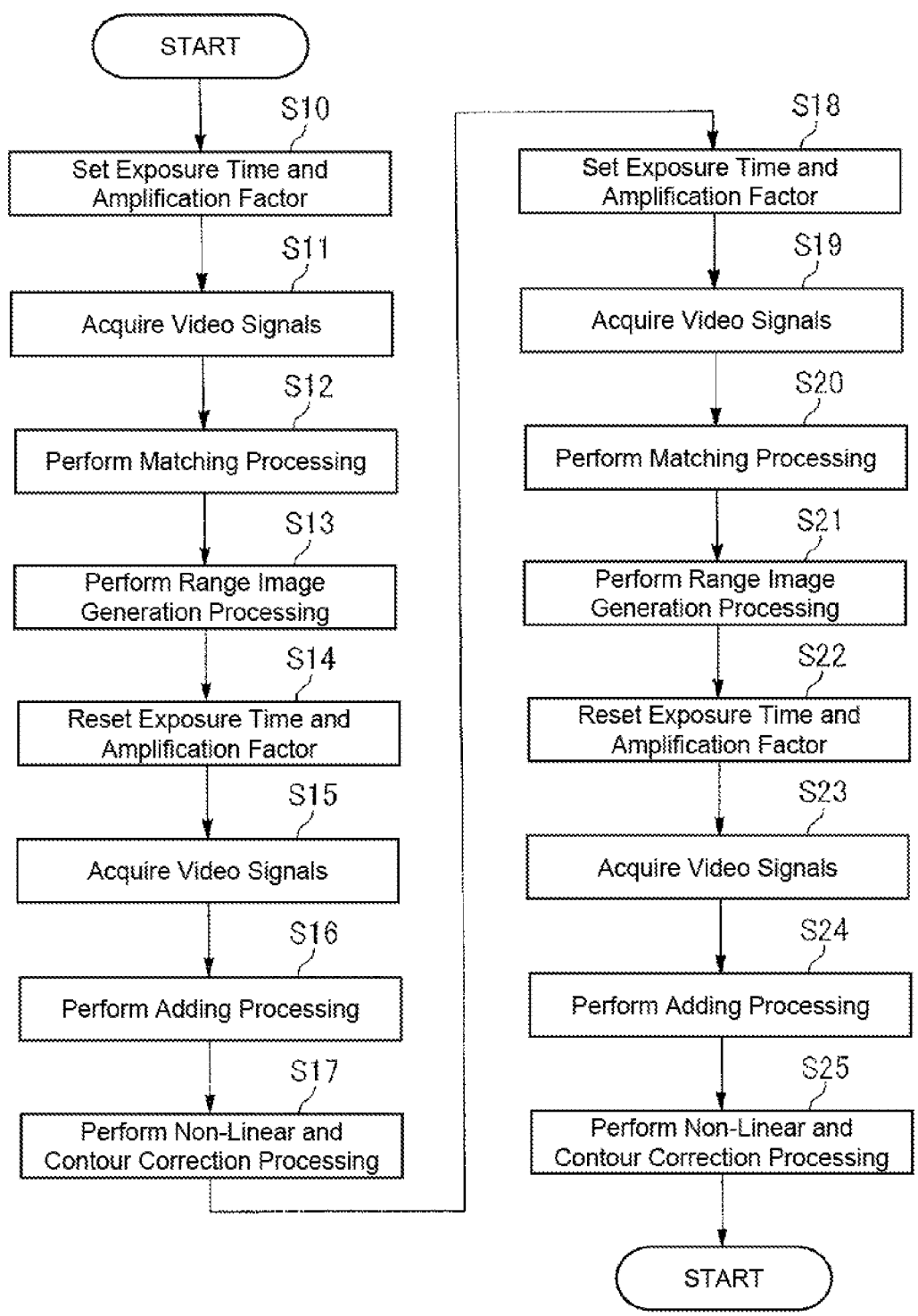
FIG. 4 is a flowchart that shows a processing flow that generates an image with low or medium brightness and an image with high brightness according to an embodiment of the present invention.

FIG. 4 is a flowchart that shows a processing flow that generates an image with low or medium brightness and an image with high brightness. As shown in FIG. 4, in the image processing apparatus 1, first, an exposure time (for example, the exposure time Tc1) and an amplification factor (for example, the amplification factor A1) for a low to medium brightness are set in the two imaging devices 3 and the two amplifier circuits 4 (S10), and two video signals (the first video signal and the second video signal) are acquired (S11). Next, matching processing is performed with respect to the two video signals (the first video signal and the second video signal), and a minimum disparity amount is determined for each pixel (S12). Subsequently, processing is performed to generate a range image for low to medium brightness based on the minimum disparity amount for each pixel that is obtained as the result of the matching processing (S13).

Next, an exposure time for a short exposure (for example, the exposure time Tc2s) is set in one of the imaging devices 3 (imaging device A), an amplification factor for a short exposure (for example, the amplification factor A2s) is set in one of the amplifier circuits 4 (amplifier circuit A), an exposure time for a long exposure (for example, the exposure time Tc2l) is set in the other imaging device 3 (imaging device B), and an amplification factor for a long exposure (for example, the amplification factor A2l) is set in the other amplifier circuit 4 (amplifier circuit B) (S14).

Subsequently, two video signals (the third video signal and the fourth video signal) are acquired from the two imaging devices 3 (S15), one of the video signals is shifted by the minimum disparity amount for each pixel that is obtained as the result of the above described matching processing (S12), and the two video signals for low to medium brightness are added together (S16). Finally, a video signal obtained by adding the two video signals in S16 is subjected to non-linear processing and contour correction processing to generate a monitoring image for low to medium brightness (S17).

Next, an exposure time (for example, the exposure time Tc3) and an amplification factor (for example, the amplification factor A3) for a high brightness are set in the two imaging devices 3 and the two amplifier circuits 4 (S18), and two video signals (the first video signal and the second video signal) are acquired (S19). Subsequently, matching processing of the two video signals (the first video signal and the second video signal) is performed to determine a minimum disparity amount for each pixel (S20). Processing is then performed to generate a range image for high brightness based on the minimum disparity amount for each pixel obtained as a result of the matching processing (S21).

Next, an exposure time for a short exposure (for example, the exposure time Tc4s) is set in one of the imaging devices 3 (imaging device A), an amplification factor for a short exposure (for example, the amplification factor A4s) is set in one of the amplifier circuits 4 (amplifier circuit A), an exposure time for a long exposure (for example, the exposure time Tc4l) is set in the other imaging device 3 (imaging device B), and an amplification factor for a long exposure (for example, the amplification factor A4l) is set in the other amplifier circuit 4 (amplifier circuit B) (S22).

Subsequently, two video signals (the third video signal and the fourth video signal) are acquired from the two imaging devices 3 (S23), one of the video signals is shifted by the minimum disparity amount for each pixel that is obtained as the result of the above described matching processing (S20), and the two video signals for high brightness are added together (S24). Finally, the video signal obtained by the addition processing in S24 is subjected to non-linear processing and contour correction processing to generate a monitoring image for high brightness (S25).

According to the image processing apparatus 1 of this embodiment of the present invention, two video signals (the third video signal and the fourth video signal) obtained from two image pickup sections are added together in a manner that takes into consideration a disparity amount between the video signals, and a video signal obtained as a result of adding the two video signals is utilized as a monitoring image. Hence, a monitoring image of high image quality can be acquired.

More specifically, according to the present embodiment, matching processing is executed on video signals (the first video signal and the second video signal) obtained from two image pickup sections, and a disparity amount between the video signals obtained from the two image pickup sections is determined. Subsequently, two video signals (the third video signal and the fourth video signal) are added together in a manner that takes into consideration a disparity amount between the video signals obtained from the two image pickup sections, and a video signal obtained as a result of adding the two video signals is utilized as a monitoring image. Since the video signal obtained by adding the two video signals has a higher S/N ratio than a single video signal, a monitoring image of good image quality can be obtained. In this case, as well as obtaining a monitoring image of good image quality, an image for distance measurement (a range image) can also be obtained.

Further, according to the present embodiment, an exposure time or an amplification factor is controlled so that a brightness level of a video signal is within a predetermined range of brightness levels. For example, for a low- or medium-brightness video signal, control is performed so as to lengthen the exposure time or increase the amplification factor. Further, for a high-brightness video signal, control is performed so as to shorten the exposure time or decrease the amplification factor. As a result, even when a high-brightness subject is photographed, a decline in the image quality due to a white washout can be suppressed, and the accuracy of matching processing that uses two video signals (the first video signal and the second video signal) can be improved. Thus, even when a high-brightness subject is photographed, since two video signals (the third video signal and the fourth video signal) that are based on a result (minimum disparity amount) of highly accurate matching processing can be added together, a monitoring image of good image quality can be obtained. Furthermore, in this case, an accurate range image can be obtained with respect to video signals that have a low brightness, a medium brightness, and a high brightness, respectively, and it is thus possible to calculate a distance with a high degree of accuracy even when subjects that have a variety of brightness are photographed.

Furthermore, according to the present embodiment, since the exposure times of the third video signal and the fourth video signal can be made to differ from each other, the dynamic range of a monitoring image obtained by adding together the two video signals (the third video signal and the fourth video signal) can be extended. For example, when photographing a high-brightness subject, although control is performed to shorten the exposure times of both the third video signal and the fourth video signal, in this case, the exposure time of the third video signal is also controlled so as to be shorter than the exposure time of the fourth video signal. Thus, even when a high-brightness subject is photographed, it is possible to reduce the occurrence of a white washout in a monitoring image (an image obtained by adding the third video signal and the fourth video signal), and a monitoring image with gradations can be obtained even when the subject has a high level of brightness.

Further, according to the present embodiment, with respect to the first video signal and the second video signal, in the first time period, video signals (for example, which have a low or medium brightness level) that are within a first brightness level range are obtained, and in the third time period, video signals (for example, which have a high brightness level) that are within a third brightness level range are obtained. On the other hand, with respect to the third video signal and the fourth video signal, in the second time period, video signals (for example, which have a low or medium brightness level) that are within a second brightness level range are obtained, and in the fourth time period, video signals (for example, which have a high brightness level) that are within a fourth brightness level range are obtained. Thus, video signals that have different levels of brightness can be obtained over the first to fourth time periods. Accordingly, it is possible to acquire a monitoring image that is obtained by adding video signals (the third video signal and the fourth video signal) which have brightness levels that are in a wide range of brightness levels (a wide range from a low brightness to a high brightness), and thus the dynamic range of the monitoring image can be extended. Therefore, for example, even when a high-brightness subject is photographed, it is possible to reduce the occurrence of a white washout in the monitoring image (an image obtained by adding the third video signal and the fourth video signal), and a monitoring image with gradations can be obtained even when a subject has a high level of brightness. Furthermore, in this case, an accurate range image can be obtained with respect to a wide range of brightness levels (a wide range from a low brightness to a high brightness), and it is therefore possible to improve the accuracy of distance measurement.

Although an embodiment of the present invention has been described above by way of example, the scope of the present invention is not limited thereto, and changes and modifications can be made in accordance with purposes within the scope of the invention as set forth in the claims.

For example, although an example that uses two of the imaging devices 3 is described above, the scope of the present invention is not limited thereto, and a configuration may be adopted in which two image regions are extracted from a single imaging device 3, and signals for those image regions are employed as two video signals. Further, a configuration may be adopted in which updating of a monitoring image is performed faster by setting the time periods T1 and T3 so as to be shorter than the time periods T2 and T4.

While a currently conceivable, preferred embodiment of the present invention has been described above, it will be understood that various modifications and changes can be made to the embodiment. It is, therefore, intended to cover in the attached claims all such modifications and changes that fall within the true spirit and scope of the present invention.

INDUSTRIAL APPLICABILITY

As described above, an image processing apparatus according to the present invention has the advantageous effect of enabling a monitoring image of high image quality to be obtained by adding two video signals together and utilizing the resulting video signal as a monitoring image. Thus, the image processing apparatus according to the present invention is useful as a stereo image processing apparatus or the like.

REFERENCE SIGNS LIST 1 image processing apparatus
2 lens
3 imaging device
4 amplifier circuit
5 matching circuit
6 adding circuit
7 non-linear processing and contour correction circuit
8 range image generating circuit
9 exposure and amplification control circuit

The invention claimed is:

1. An image processing apparatus, comprising:
a matching section that, with respect to a first video signal obtained from a first image pickup section and a second video signal obtained from a second image pickup section, performs matching processing that minimizes a disparity amount between the first video signal and the second video signal;
an addition section that shifts a third video signal obtained from the first image pickup section by a minimum disparity amount that is obtained as a result of the matching processing, and adds the thus-shifted third video signal to a fourth video signal obtained from the second image pickup section; and
a monitoring image generation section that performs non-linear processing and/or contour correction processing with respect to the video signal obtained by adding the third video signal to the fourth video signal, and generates a monitoring image.

2. The image processing apparatus according to claim 1, comprising a range image generation section that generates an image for distance measurement based on the minimum disparity amount that is obtained as a result of the matching processing.

3. The image processing apparatus according to claim 1, comprising:
a control section that controls an exposure time or an amplification factor of the first video signal and the second video signal so that the first video signal and the second video signal are within a predetermined range of brightness levels;
wherein the matching section performs matching processing with respect to the first video signal and the second video signal that are within the predetermined range of brightness levels as a result of the control by the control section.

4. The image processing apparatus according to claim 1, comprising a second control section that controls an exposure time of the third video signal and an exposure time of the fourth video signal so that the exposure time of the third video signal and the exposure time of the fourth video signal are mutually different.

5. The image processing apparatus according to claim 1, comprising:
a third control section that controls an exposure time or an amplification factor of the first video signal, the second video signal, the third video signal, and the fourth video signal;
wherein the third control section:
in a first time period, controls an exposure time or an amplification factor of the first video signal and the second video signal so that the first video signal and the second video signal are within a first brightness level range;
in a second time period, controls an exposure time or an amplification factor of the third video signal and the fourth video signal so that the third video signal and the fourth video signal are within a second brightness level range;
in a third time period, controls an exposure time or an amplification factor of the first video signal and the second video signal so that the first video signal and the second video signal are within a third brightness level range that is different to the first brightness level range; and
in a fourth time period, controls an exposure time or an amplification factor of the third video signal and the fourth video signal so that the third video signal and the fourth video signal are within a fourth brightness level range that is different to the second brightness level range.

6. An image processing method, including:
performing matching processing that, with respect to a first video signal obtained from a first image pickup section and a second video signal obtained from a second image pickup section, minimizes a disparity amount between the first video signal and the second video signal;
shifting a third video signal obtained from the first image pickup section by a minimum disparity amount obtained as a result of the matching processing, and adding the thus-shifted third video signal to a fourth video signal obtained from the second image pickup section; and
performing non-linear processing and/or contour correction processing with respect to the video signal obtained by adding the third video signal to the fourth video signal, and generating a monitoring image.

7. The image processing method according to claim 6, including generating an image for distance measurement based on the minimum disparity amount that is obtained as a result of the matching processing.

8. The image processing method according to claim 6, including:
controlling an exposure time or an amplification factor of the first video signal and the second video signal so that the first video signal and the second video signal are within a predetermined range of brightness levels;
wherein the matching processing is performed with respect to the first video signal and the second video signal that are within the predetermined range of brightness levels as a result of the control.

9. The image processing method according to claim 6, including controlling an exposure time of the third video signal and an exposure time of the fourth video signal so that the exposure time of the third video signal and the exposure time of the fourth video signal are mutually different.

10. The image processing method according to claim 6, including:

controlling an exposure time or an amplification factor of the first video signal, the second video signal, the third video signal, and the fourth video signal;

wherein:

in a first time period, an exposure time or an amplification factor of the first video signal and the second video signal is controlled so that the first video signal and the second video signal are within a first brightness level range;

in a second time period, an exposure time or an amplification factor of the third video signal and the fourth video signal is controlled so that the third video signal and the fourth video signal are within a second brightness level range;

in a third time period, an exposure time or an amplification factor of the first video signal and the second video signal is controlled so that the first video signal and the second video signal are within a third brightness level range that is different to the first brightness level range; and in a fourth time period, an exposure time or an amplification factor of the third video signal and the fourth video signal is controlled so that the third video signal and the fourth video signal are within a fourth brightness level range that is different to the second brightness level range.

11. A non-transitory computer readable medium having stored thereon an image processing program that causes a computer to execute:

matching processing that, with respect to a first video signal obtained from a first image pickup section and a second video signal obtained from a second image pickup section, minimizes a disparity amount between the first video signal and the second video signal;

processing that shifts a third video signal obtained from the first image pickup section by a minimum disparity amount that is obtained as a result of the matching processing, and adds the thus-shifted third video signal to a fourth video signal obtained from the second image pickup section; and processing that carries out non-linear processing and/or contour correction processing with respect to the video signal obtained by adding the third video signal to the fourth video signal, and generates a monitoring image.

* * * * *